United States Patent Office 3,312,716
Patented Apr. 4, 1967

3,312,716
4-HYDROXY-3-PYRROLIDINEMETHANOLS
John H. Biel and Ernst Jaeger, Milwaukee, Wis., assignors to Aldrich Chemical Co., Inc., Milwaukee, Wis., a corporation of Wisconsin
No Drawing. Filed Aug. 11, 1964, Ser. No. 388,958
7 Claims. (Cl. 260—326.5)

This invention relates to novel compounds and to processes of producing such compounds. More particularly this invention relates to novel 4-hydroxy-3-pyrrolidinemethanols.

According to this invention there are provided the free bases, acid addition and quaternary salts of compounds of the following general formula:

(1)

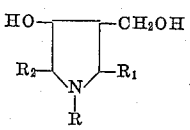

where R is selected from the group consisting of hydrogen; lower alkyl such as methyl, ethyl, propyl, isopropyl, butyl, hexyl and the like; aralkyl, particularly phenyl lower alkyl such as benzyl and phenethyl; lower alkenyl such as allyl, methallyl and propenyl; a lower alkynyl group such as propargyl; an aryl group such as phenyl and naphthyl; and benzoyl lower alkyl such as 3-benzoylpropyl, 3-p-fluorobenzoylpropyl and 2-benzoylethyl; and $R_1$ and $R_2$ are selected from the group consisting of hydrogen, lower alkyl such as methyl, ethyl, propyl, isopropyl, butyl, hexyl and the like and a lower alkenyl group such as allyl, methallyl and propenyl.

The compounds of this invention are prepared by reacting a glycine ester of the following general formula:

(2)

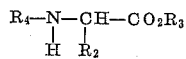

wherein $R_4$ is selected from the group consisting of lower alkyl such as methyl, ethyl, propyl, isopropyl, butyl, hexyl and the like; aralkyl, particularly phenyl lower alkyl such as benzyl and phenethyl; lower alkenyl such as allyl, methallyl and propenyl; a lower alkynyl group such as propargyl; and an aryl group such as phenyl and naphthyl; $R_2$ is the same as previously assigned and $R_3$ is selected from the group consisting of a lower alkyl group such as methyl and ethyl, an aralkyl group such as benzyl, and an aryl group such as phenyl with an acrylic acid ester of the following general formula:

(3)          $R_1$—CH=CH—$CO_2R_3$ wherein $R_1$ and $R_3$ have the significance previously assigned in the presence of a basic catalyst such as benzyltrimethylammonium hydroxide to produce a compound having the following general formula:

(4)

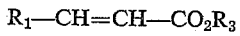

where $R_1$, $R_2$, $R_3$ and $R_4$ have the significance previously assigned.

Base catalyzed cyclization, in a manner well known in the art, of the diester as represented by Formula 4 yields compounds of the following general formula:

(5)

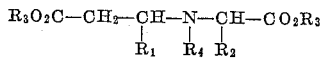

These compounds may be converted to the desired diols by reacting with lithium aluminum hydride in anhydrous tetrahydrofuran. Such a reaction, however, is hazardous, expensive and of low yield. It has now been discovered that if sodium borohydride is used in 400–600% molar excess in methanol, the keto ester depicted in Formula 5 is reduced smoothly and in high yields to the desired 4-hydroxy-3-pyrrolidinemethanols.

Normally, the reduction of the keto ester of Formula 5 would result in the formation of both cis and trans isomers. When sodium borohydride is employed, however, one of the geometric isomers appears to be formed preponderantly. It has not, however, been ascertained which geometric isomer it is.

The foregoing multi-step synthesis of the compounds of the invention may be represented schematically as follows:

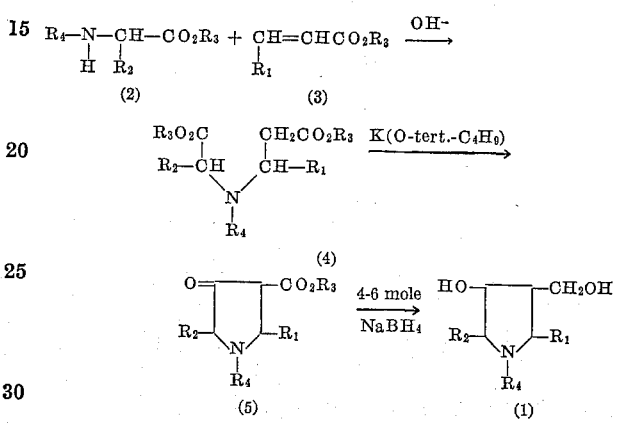

Illustrative of the glycine esters (2) that can be used are:

(1) Ethyl N-methylglycinate
(2) Methyl N-allyl-α-methylglycinate
(3) Ethyl N-benzylglycinate
(4) Methyl N-propyl-α-allylglycinate
(5) Ethyl N-propargylglycinate
(6) Methyl N-phenethylglycinate
(7) Methyl N-phenyl-α-ethylglycinate
(8) Ethyl N-cinnamylglycinate
(9) Benzyl N-benzylglycinate
(10) Methyl N-benzyl-α-methylglycinate
(11) Methyl N-benzyl-α-allylglycinate Representative acrylic acid esters (3) which may be used are:

(1) Ethyl acrylate
(2) Methyl acrylate
(3) Benzyl acrylate
(4) Methyl crotonate
(5) Methyl-β-allylacrylate
(6) Ethyl-β-ethylacrylate Some of the 4-hydroxy-3-pyrrolidinemethanols produced in the invention are:

(1) 1-benzyl-4-hydroxy-3-pyrrolidinemethanol
(2) 4-hydroxy-1-methyl-3-pyrrolidinemethanol
(3) 1-allyl-4-hydroxy-3-pyrrolidinemethanol
(4) 4-hydroxy-1-propargyl-3-pyrrolidinemethanol
(5) 4-hydroxy-1-phenethyl-3-pyrrolidinemethanol
(6) 1-cinnamyl-4-hydroxy-3-pyrrolidinemethanol
(7) 4-hydroxy-1-phenyl-3-pyrrolidinemethanol
(8) 1-benzyl-4-hydroxy-2-methyl-3-pyrrolidinemethanol
(9) 2-ethyl-4-hydroxy-1-methyl-3-pyrrolidinemethanol
(10) 2-allyl-1-benzyl-4-hydroxy-3-pyrrolidinemethanol
(11) 1-benzyl-4-hydroxy-5-methyl-3-pyrrolidinemethanol
(12) 1-benzyl-5-ethyl-4-hydroxy-3-pyrrolidinemethanol
(13) 5-allyl-1-benzyl-4-hydroxy-3-pyrrolidinemethanol To obtain 4-hydroxy-3-pyrrolidinemethanols of Formula 1 where R is hydrogen, the corresponding 1-benzyl derivatives are subjected to catalytic hydrogenolysis or chemical treatment in a manner well known in the art.

In cases of unsaturated side chains, i.e., where $R_1$ or $R_2$ are allyl, methallyl or propenyl, replacement of the benzyl group with hydrogen is achieved by first treating the compound with ethyl chloroformate to form the carbamate, followed by hydrolysis of the carbamate to the secondary amine. This reaction may be represented as follows:

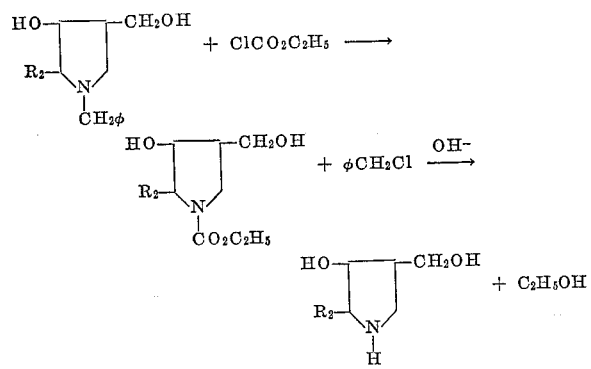

where $R_2$ is allyl, methallyl or propenyl.

Compounds of Formula 1 where R is other than hydrogen or benzyl can be obtained by several routes. Thus, the particular substitution on the nitrogen of the pyrrolidine ring may be varied by starting with the appropriate N-substituted glycine ester [Formula 2]. Alternately, the N-unsubstituted 4-hydroxy-3-pyrrolidinemethanols [Formula 6] may be reacted with an appropriate halide such as ethyl bromide, butyl bromide, allyl chloride, propargyl bromide, phenethyl bromide, 3-benzoylpropyl bromide, 3-p-fluorobenzoylpropyl bromide and cinnamyl chloride. This reaction is usually carried out by reacting equimolar quantities of the 4-hydroxy-3-pyrrolidinemethanol and the appropriate halide in an inert solvent such as benzene, toluene, xylene, acetone or dimethylformamide in the presence of an acid acceptor such as triethylamine or potassium carbonate. This method appears to produce the best results when compounds where R is benzoyl lower alkyl are desired. The alkylation or aralkylation of a secondary amine may, however, produce significant quantities of undesired dialkyl or diaralkylbisquaternary salts. This undesirable result may be obviated by another route of producing compounds where R is other than hydrogen or benzyl.

This involves a method which, to the best of our knowledge, is unique for arriving at tertiary amine derivatives. This involves the quaternization of a 1-benzyl-4-hydroxy-3-pyrrolidinemethanol with an appropriate alkyl or aralkyl halide such as methyl bromide, butyl bromide or 3-phenylpropyl bromide and the subsequent catalytic debenzylation of the quaternary salt to yield the desired N-alkyl or N-aralkyl-4-hydroxy-3-pyrrolidine methanol.

Acid addition salts of the described novel compounds are produced by contacting the free base with a suitable mineral or organic acid such as sulfuric acid, hydrochloric acid, phosphoric acid, formic acid, citric acid, fumaric acid, maleic acid, methanesulfonic acid and cyclohexanesulfonic acid.

Quaternary salts of the bases are readily produced by contacting the base in the presence of a suitable solvent with an appropriate alkylating or aralkylating agent such as methyl bromide or ethyl chloride, a lower alkyl sulfate such as ethyl sulfate or a phenylalkyl halide or sulfate such as phenethyl chloride or benzyl sulfate.

The invention will now be illustrated by, but it is not intended to be limited to, the following examples:

*Example 1.—N-benzyl-N-(carboxymethyl)-β-alanine diethyl ester*

$$C_2H_5CO_2CH_2CH_2-N-CH_2CO_2C_2H_5$$
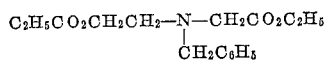

A mixture of 483 g. (2.5 mole) of ethyl N-benzylglycinate, 275 g. (2.75 mole) of ethyl acrylate and 3 ml. of benzyltrimethylammonium hydroxide catalyst was refluxed for 24 hours. Unreacted starting materials were removed by distillation through a 6″ column. The residue was then distilled without column at 150–160°/0.3 mm. to provide 300 g. (40.8%) of product, which was purified by redistillation; B.P. 135°/0.04 mm.; $n_D^{25}$ 1.4910.

*Analysis.*—Calcd. for $C_{16}H_{23}NO_4$: C, 65.51; H, 7.90; N, 4.78; O, 21.82. Found: C, 65.66; H, 7.97; N, 4.60; O, 21.99.

*Example 2.—Ethyl 1-benzyl-4-oxopyrrolidinecarboxylate*

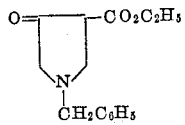

Potassium tert.-butylate (112.1 g., 1.0 mole) was slurried in 1.5 of dry toluene. The mixture was cooled to 5° and 293 g. (1.0 mole) of the product produced in Example 1 was added slowly with stirring within 2 hrs. The temperature was kept below 10°. Stirring was continued for 3 hrs. Then the mixture was extracted with two 500 ml. portions of ice cold water. The aqueous layer was extracted several times with ether, was then made strongly acid with concentrated hydrochloric acid and was extracted again with ether to remove all side products. Finally, the aqueous acid solution was brought to pH 7.0 with potassium carbonate and the β-ketoester was extracted with ether until the last ether extract showed no $FeCl_3$ reaction. The ether solution was dried with anhydrous magnesium sulfate. After removal of ether, 142 g. (57.5%) of product remained as a slightly colored oil; $n_D^{25}$ 1.5264.

*Analysis.*—Calcd. for $C_{14}H_{17}NO_3$: C, 67.99; H, 6.93; N, 5.66; O, 19.41. Found: C, 67.88; H, 6.94; N, 5.72; O, 19.54.

*Example 3.—1-benzyl-4-hydroxy-3-pyrrolidinemethanol*

(A) *By lithium aluminum hydride reduction*—To a well stirred slurry of 38 g. (1.0 mole) of lithium aluminum hydride in 1.5 l. dry tetrahydrofuran was added slowly a solution of 247.0 g. (1.0 mole) of the product of Example 2 in 1 l. of dry tetrahydrofuran. The temperature of the reaction mixture was kept below 25° and stirring was continued overnight at room temperature. Then 300 ml. of saturated sodium sulfate solution was added very carefully. Dilution with tetrahydrofuran is necessary to keep the mixture stirrable. After filtration, the residue was extracted with 300 ml. boiling tetrahydrofuran and filtered again. The combined filtrates were dried with anhydrous magnesium sulfate. After removal of the solvent a mixture of low boiling reaction products was distilled off in vacuo through a 6″ column at 120–160°/0.08 mm. The residue was then distilled without column to yield 106.5 g. (51.2%) of product, B.P. 160–170°/0.08 mm. Redistillation of a portion of this material gave an analytical sample, B.P. 145–147°/0.01 mm., $n_D^{25}$ 1.5585.

*Analysis.*—Calcd. for $C_{12}H_{17}NO_2$: C, 69.54; H, 8.27; N, 6.76; O, 15.44. Found: C, 69.68; H, 8.37; N, 6.92; O, 15.54.

(B) *By sodium borohydride reduction*—To a well stirred solution of 123.5 g. (0.5 mole) of ethyl 1-benzyl-4-oxopyrrolidinecarboxylate in 1.0 l. methanol was added 114 g. (3.0 mole) of sodium borohydride in portions within 0.5 hr. The temperature of the reaction mixture was kept below 25° and stirring was continued overnight. After removal of methanol in vacuo, the residue was dissolved in 500 ml. of water and left standing for 1 hr. The aqueous solution was then extracted with three portions of 250 ml. of chloroform, the chloroform was removed in vacuo and the residue was dissolved in 400 ml. of 10% hydrochloric acid and again left standing for 1 hr. Then the solution was made strongly alkaline and was again extracted with chloroform. After drying over anhydrous magnesium sulfate and removal of solvent, 74.6 g. (72.1%) of 4-hydroxy-3-pyrrolidinemethanol could be distilled as a highly viscous white oil, B.P. 150–160°/0.03 mm. No low boiling material was obtained. Redistillation gave an analytical sample, B.P. 147–148°/0.01 mm., $n_D^{25}$ 1.5583.

The product was identical in every respect with the diol obtained by Method A.

*Analysis.*—Calcd. for $C_{12}H_{17}NO_2$: C, 69.54; H, 8.67; N, 6.76; O, 15.44. Found: C, 69.39; H, 8.12; N, 6.91; O, 15.53.

*Example 4.—4-hydroxy-3-pyrrolidinemethanol*

A solution of 41.4 g. (0.2 mole) of 1-benzyl-4-hydroxy-pyrrolidinemethanol in 300 ml. of absolute ethanol was neutralized with the equivalent amount of ethanolic hydrogen chloride. The solution was shaken together with 5 g. of 10% palladium-on-charcoal in an atmosphere of hydrogen at a pressure of 60 p.s.i. The theoretical amount of hydrogen was taken up in 24 hours. The solution was clarified by filtration and a solution of 11.2 g. (0.2 mole) of potassium hydroxide in 100 ml. of absolute ethanol was added. The precipitate of potassium chloride was removed by filtration. After removal of the solvent the residue was distilled in vacuo to yield 22.1 g. (94.3%) of a colorless viscous oil, B.P. 148–149°/0.03 mm., $n_D^{20}$ 1.5122.

*Analysis.*—Calcd. for $C_5H_{11}NO_2$: N, 11.96. Found: N, 11.80.

*Example 5.—4-hydroxy-1-phenethyl-3-pyrrolidinemethanol*

To a refluxing mixture of 11.7 g. (0.1 mole) of 4-hydroxy-3-pyrrolidinemethanol, 12.1 g. (0.12 mole) of triethylamine and 100 ml. of ethanol was added dropwise within one hr. 18.5 g. (0.1 mole) of phenethyl bromide with stirring. Refluxing was continued for 8 hrs. After removal of solvent the residue was treated with 10% potassium hydroxide solution and the product was extracted with ether and distilled after drying over anhydrous magnesium sulfate, B.P. 175°/0.04 mm.

The distilled product solidified on standing to give 11.2 g. (61.2%) of 4-hydroxy-1-phenethyl-3-pyrrolidinemethanol, M.P. 99–110°.

*Analysis.*—Calcd. for $C_{13}H_{19}NO_2$: C, 70.55; H, 8.65; N, 6.33; O, 14.46. Found: C, 70.40; H, 8.65; N, 6.38; O, 14.59.

*Example 6.—1-(3-benzoylpropyl)-4-hydroxy-3-pyrrolidinemethanol hydrochloride*

A mixture of 3.5 g. (0.03 mole) of 4-hydroxy-3-pyrrolidinemethanol, 5.5 g. (0.03 mole) of γ-chlorobutyrophenone, 4.2 g. (0.03 mole) of anhydrous potassium carbonate, 5.0 g. (0.03 mole) of potassium iodide and 80 ml. of dimethylformamide was refluxed with stirring for 16 hrs. The mixture was then poured into water. The crude oil, which separated, was dissolved in methylene chloride and dried over anhydrous magnesium sulfate and then converted to the hydrochloride, M.P. 93–95°.

*Example 7.—4-hydroxy-1-methyl-3-pyrrolidinemethanol*

To a solution of 6.2 g. (0.03 mole) of 1-benzyl-4-hydroxy-3-pyrrolidinemethanol in 200 ml. of isopropanol was added slowly with stirring a solution of 5.7 g. (0.06 mole) of methyl bromide in 50 ml. of isopropanol. The mixture was then refluxed for 6 hrs., using a Dry Ice condenser. After removal of the solvent the residue was treated with ether to remove starting materials. The ether insoluble quaternary compound was dissolved again in 100 ml. isopropanol and was hydrogenated in the presence of 2 g. of 10% palladium-on-charcoal at a hydrogen pressure of 60 p.s.i. for 6 hrs. The oily hydrobromide which remained after removal of the solvent was converted to the free base which was extracted from aqueous alkaline solution with chloroform, dried over anhydrous magnesium sulfate and distilled, B.P. 104–106°/0.01 mm.; $n_D^{25}$ 1.4943.

*Analysis.*—Calcd. for $C_6H_{13}NO_2$: C, 54.94; H, 9.99; N, 10.68; O. 24.40. Found: C, 54.87; H, 9.96; N, 10.70; O, 24.61.

The 4-hydroxy-3-pyrrolidinemethanols of this invention have a number of uses. They are, for example, buffering agents and can be used to neutralize acid solutions, thus eliminating metallic corrosion. They are also useful in the isolation of penicillin from fermentation broths. The presence of multiple polar groups in the modecules endows the compounds with excellent chelating properties for the recovery of trace metals such as cobalt and iron.

Some of the N-substituted 4-hydroxy-3-pyrrolidinemethanols produce muscle relaxant and calming effects in animals. In addition, they are important intermediates for the synthesis of therapeutically active esters which may be used as anti-spasmodic and anti-secretory agents. Moreover, stable dichlorides can be obtained from these diols which are highly reactive intermediates for the synethesis of pharmaceutical and agricultural products. The dichlorides also exhibit therapeutic properties. 1-benzyl-4-chloro-3-chloromethylpyrrolidine, for example, produces pronounced analgetic effects in rats at 50 mg./kilo.

Various changes and modifications of the invention can be made and, to the extent that such variations incorporate the spirit of this invention, they are intended to be included within the scope of the appended claims.

What is claimed is:

1. A compound selected from the group consisting of (a) a compound of the formula:

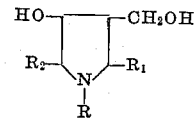

where R is selected from the group consisting of hydrogen, lower alkyl, phenyl lower alkyl, lower alkenyl, lower alkynyl and benzoyl lower alkyl, and $R_1$ and $R_2$ are each selected from the group consisting of hydrogen, lower alkyl and lower alkenyl; (b) pharmaceutically acceptable acid addition salts thereof; and (c) quaternary salts thereof consisting of quaternary salts selected from the group consisting of lower alkyl halides and sulfates, and phenyl-lower alkyl halides and sulfates.

2. 1-benzyl-4-hydroxy-3-pyrrolidinemethanol.
3. 4-hydroxy-3-pyrrolidinemethanol.
4. 4-hydroxy-1-phenethyl-3-pyrrolidinemethanol.
5. 1-(3-benzoylpropyl)-4-hydroxy-3 - pyrrolidinemethanol.
6. 4-hydroxy-1-methyl-3-pyrrolidinemethanol.
7. A method for the preparation of a compound selected from the group consisting of (a) a compound of the formula:

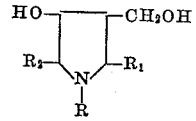

where R is selected from the group consisting of hydrogen, lower alkyl, phenyl lower alkyl, lower alkenyl, lower alkynyl and benzoyl lower alkyl, and $R_1$ and $R_2$ are each selected from the group consisting of hydrogen, lower alkyl and lower alkenyl; (b) pharmaceutically acceptable acid addition salts thereof; and (c) quaternary salts thereof consisting of quaternary salts selected from the group consisting of lower alkyl halides and sulfates, and phenyl-lower alkyl halides and sulfates, comprising reducing in methanol a compound of the following formula:

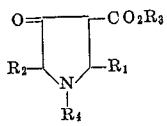

where $R_1$ and $R_2$ have the same significance set forth above; $R_3$ is selected from the group consisting of lower alkyl, benzy and phenyl; and $R_4$ is selected from the group consisting of lower alkyl, phenyl lower alkyl, lower alkenyl, lower alkynyl, phenyl and naphthyl, with 400 to 600% molar excess of sodium borohydride.

References Cited by the Examiner
UNITED STATES PATENTS
2,945,886   7/1960   Brown _____ 260—570.9

FOREIGN PATENTS
667,923   3/1952   Great Britain.
799,030   7/1958   Great Britain.

OTHER REFERENCES
Fieser et al.: Organic Chemistry (1956), page 228.
Kägi et al.: Helvetica Chimica Acta, vol. 32, page 2489 (1949).
Kollonitsch et al.: Nature (1954), pp. 125–26.

ALEX MAZEL, *Primary Examiner.*

HENRY R. JILES, *Examiner.*

JOSEPH A. NARCAVAGE, *Assistant Examiner.*